INVENTORS
BRUCE W. WALLACE
KENNETH D. McINTIRE JR.

BY Jack E. Munro
— AGENT —

United States Patent Office 3,428,002
Patented Feb. 18, 1969

3,428,002
PALLET ASSEMBLY
Kenneth D. McIntire, Jr., Norwalk, Calif., and Bruce W. Wallace, Seattle, Wash., assignors to McDonnell Douglas Corporation, a corporation of Maryland
Filed Nov. 1, 1967, Ser. No. 679,855
U.S. Cl. 108—51      4 Claims
Int. Cl. B65d 19/00

ABSTRACT OF THE DISCLOSURE

A cargo pallet having a resilient edge which includes a load distribution flange and integrally mounted net securing fittings. The entire pallet is held together by removable fastening means to permit ease of replacement.

Background of the invention

In the transporting of cargo some type of apparatus needs to be used to support and retain the cargo during its movement. For this purpose, a load supporting device, frequently referred to as the pallet, is quite often employed. Generally, a pallet is a substantial planer surface which is employed in a horizontal manner upon which several objects of cargo are fixedly supported. The pallet is especially adapted for retaining the cargo during transportation thereof and it is also designed to make movement of the loaded pallet to and from the primary transportation means as easy as possible. Usually conveyor systems which include low friction rolling devices are used to move the pallet into and out of the primary transportation means.

Common types of primary transportation means are vehicles such as trucks, railroads, ships, and planes. This invention will be discussed with respect to aircraft although its use in other transportation means is quite probable. In aircraft that are specifically designed for cargo, there are fixed to the floor low frictional devices such as rollers or ball casters. It is not uncommon for a loaded pallet to weigh five thousand pounds or more and such weight can cause substantial damage to the pallet during ingress and egress of the pallet or during any shifting movement of the pallet.

Heretofore, the main consideration in the construction of pallets has been strength and durability. Usually the pallet is formed of a central panel of an extremely strong material but not of metal so that the cost may be held at a minimum. Such a material has been found to be compressed wood or paper fiber which has been chemically treated to increase its durability. To decrease damage to the panel a metal edging around the panel has usually been employed. Also, a specially machined corner attachment is usually employed which unitarily connects adjacent edging strips. If the pallet was to provide means for attaching the cargo net thereto, a completely separate cargo net attachment would be employed in conjunction with the edging.

To insure that the resultant pallet would be of maximum strength all parts thereof were usually riveted in place. The main disadvantage to the riveting of the sections of the pallet together is that if one part thereof becomes damaged (such as the panel or a portion of the edging) it is not easy to replace such and further the cost of replacement makes it economically not feasible. Therefore, as such a damaged pallet could not be used the entire pallet became discarded. As the cost of manufacture of such pallets is usually around five hundred dollars it is readily apparent that it does not take too many discarded pallets until a substantial loss is achieved.

Summary of the invention

The pallet structure of this invention employs a polygonal (rectangular or square) center panel with an edge structure fixedly attached to the panel. The panel is usually composed of a material such as wood, compressed wood, compressed paper or laminated synthetic materials. It has been found to be of best advantage to have the edging composed of a resilient metallic material, however, any material which resists damage and has high strength characteristics would be satisfactory.

Specifically, the edging is formed into a single unitary piece per side of the panel. The edging includes a longitudinal flange which is to interfit within a longitudinal groove in the exposed edge of the panel. The top and bottom sides of the edging fit flush with the panel surfaces. Bolt or screw means are used to attach the edging through the flange to the panel. The free end of the edging is formed hollow permitting a certain amount of flexibility. Included within the edging structure are a plurality of fittings which permit the cargo net to be attached thereto. These fittings are integrally formed within the edging thereby not requiring the use of an additional element.

One of the main advantages of the structure of this invention is that any force caused by load movement acting upon the cargo net is distributed throughout the entire pallet evenly without the force being concentrated in any one given place.

Another advantage is that since the edging is attached to the panel by means of screws or bolts, portions of the edging or the panel itself if damaged may be removed and a new portion inserted.

Another advantage of the device of this invention is that the specific edge design due to its resiliency decreases the possibility of damage.

A further advantage of this invention is that no special machining is required on any portion of the edging structure thereby permitting interchangeability of all parts and permits ease of repair in the field without the use of special tools.

Further objects of this invention such as higher load capability and greater pallet strength are felt to be readily apparent from the foregoing description. However, it is to be understood that further objects and advantages of this invention will be readily appreciated and more clearly understood by reference to the following description when considered in connection with the accompanying drawing.

Detailed description of the shown embodiment

Figure 1:
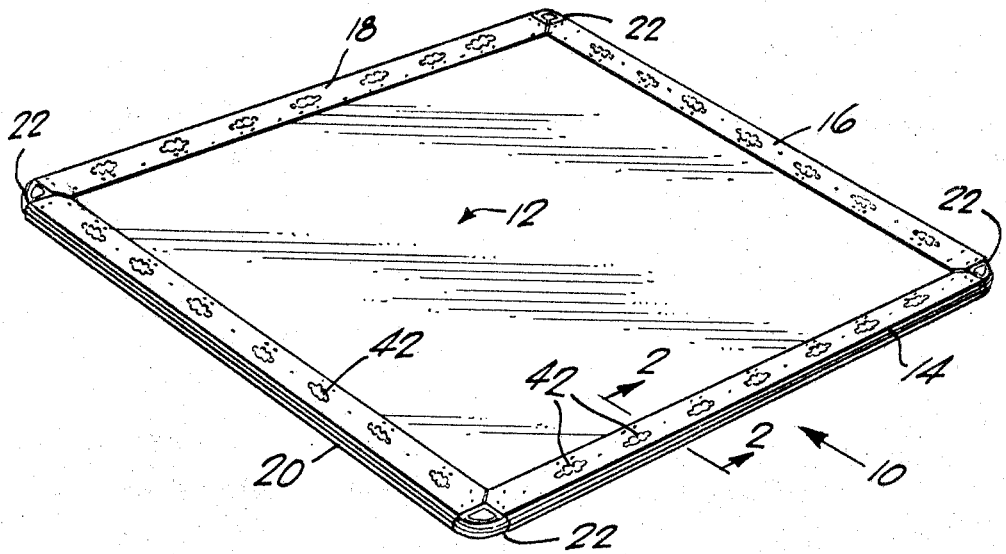
FIGURE 1 is a pictoral view of the pallet structure of this invention.

Referring with particularity to FIGURE 1, a pallet structure 10 is shown having a center panel 12 and four edge sections 14, 16, 18 and 20. Interconnecting the adjacent edge sections 14, 16, 18 and 20 are corner sections 22. Each corner section 22 has a pair of flanges 24 and 26. Flange 24 overlaps with a portion of one edge section (as 14) and the other flange 26 overlaps with the adjacent edge section (as 20). Fastening means such as bolts 28 are employed through the flanges 24 and 26 and their respective edge sections to hold the corner section 22 in its proper position. Each edge section 14, 16, 18 and 20 is identical in construction and only varies as to their longitudinal length. However, the particular pallet design shown in FIGURE 1 is square in shape and therefore the edge sections would be of the same length. In most cases the pallet would be of rectangular shape and therefore edge sections 14 and 18 would be of a slightly longer length than edge sections 16 and 20.

Figure 2:
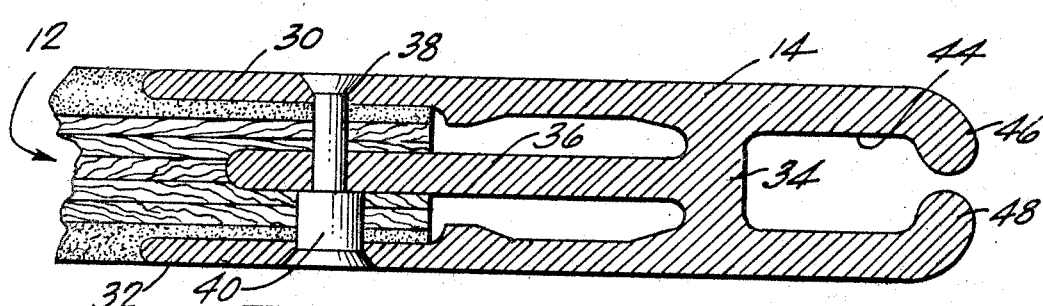
FIGURE 2 is a cross-sectional view of the edging of the pallet in FIGURE 1.
Figure 3:
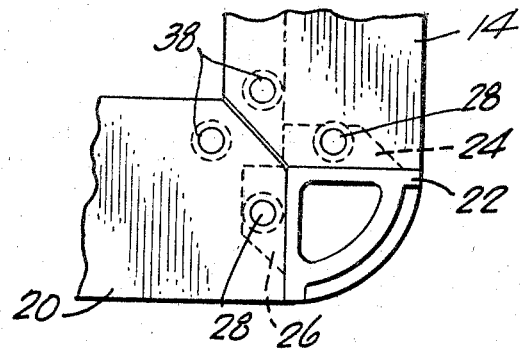
FIGURE 3 is a detailed plan view of the corner section of the pallet shown in FIGURE 1.

A cross section of the edge sections is shown in FIGURE 2. Each edge section includes a top plate 30 and a bottom plate portion 32. Plates 30 and 32 are separated a distance apart which is to permit installation of the edge section flush with the surfaces of the panel 12. Plates 30 and 32 are connected together by apex element 34. A flange element 36 protrudes from element 34 and extends in the same longitudinal direction as plates 30 and 32 but of a slightly shorter length. Flange element 36 is spaced approximately equidistantly between plates 30 and 32 and adapted to fit within a mating groove formed in the edge of the pallet panel 12. A fastening means such as bolts 38 which cooperate with locking nut 40 securely attaches the top plate 30 bottom plate 32 and flange 36 to the panel 12. The spacing between these bolts 38 is a matter of design however a three to six inch spacing has been found to be satisfactory.

Formed within the top plate 30 and bottom plate 32 is a keyway slot 42. A plurality of slots 42 are formed in each edge section longitudinally spaced from each other. Again the spacing of slots 42 is a matter of design it only being desirable to permit ease of attachment of a cargo net. The cargo net is to be placed over the cargo to maintain all the cargo elements upon the pallet during the transportation thereof. However, it is to be understood that applicants prefer not to be limited to this specific type of integral cargo net fitting but only to the integral design. It is contemplated that the edge of the pallet could be notched to form a stirrup which could provide an adequate cargo net fitting. Also, it is envisioned that numerous other types of integral fittings could be embodied in applicants pallet structure.

The unattached longitudinal edge of the edging or the edge of the pallet is constructed to include a cavity 44. Cavity 44 is formed by extensions of the plates 30 and 32 on either side thereof. The terminal ends 46 and 48 of the plates 30 and 32 respectively are turned toward each other but leaving a slight gap therebetween. This forms a rounded contour of the edge of the pallet and because of the cavity 44 the edge of the pallet has a greater deflection to decrease the possibility of the damage thereto.

With the pallet of this invention in use an easy means is provided to attach the cargo net thereto. Further, if a substantial force is created upon the pallet through the cargo net caused by a shifting load or otherwise this force is distributed throughout the entire pallet due to the employment of the flange 36. If the pallet receives a shock force on one of the edges the resiliency of the terminal ends 46 and 48 should be able to absorb without damage all or most of the shock. However, if damage to the edging does occur on one of the corners 22 the damaged section can be easily replaced as all employed fastening means 28 and 38 are readily removable.

As many embodiments may be made of this inventive concept and as many modifications may be made in the embodiment herein described and shown in the accompanying drawing, it is to be understood that all matter hereinbefore set forth is to be interpretive merely as illustrative and not in a limiting sense.

We claim:
1. A cargo pallet comprising:
a center panel of polygonal shape;
an edging assembly being attached to the outer perimeter of said center panel, said edging assembly comprising a plurality of edging members, each of said members having first and second spaced plates, the outer surfaces of said first and second plates being adapted to coincide with the respective outer surfaces of said center panel, a flange being located parallel to and intermediate said first and second plates, one end of said flange to coact with a longitudinal groove in said center panel and the other end being rigidly connected to said first and second plates, the free ends of said first and second plates being curved toward each other but do not contact, whereby the free ends of said first and second plates form the pallet edge and being resilient to absorb substantial shock force.

2. A cargo pallet as defined in claim 1 wherein:
said edging members are attached to said center panel by easily removable fastening means whereby upon damage to any portion of said pallet the damaged portion may be easily replaced.

3. A cargo pallet as defined in claim 2 wherein:
said center panel being of four sided polygonal shape, said panel being of a fibrous non-metallic construction.

4. A cargo pallet as defined in claim 3 wherein:
said edging members are formed of metallic material.

References Cited
UNITED STATES PATENTS

| | | | |
|---|---|---|---|
| 3,118,400 | 1/1964 | Kemp et al. | 108—58 |
| 3,157,423 | 11/1964 | Brie | 108—56 XR |
| 3,187,690 | 6/1965 | Desbois | 108—58 |
| 3,192,883 | 7/1965 | Massengale | 108—56 |
| 3,269,336 | 8/1966 | Naylor et al. | 108—58 |
| 3,331,336 | 7/1967 | Scholde et al. | 108—57 |

BOBBY R. GAY, Primary Examiner.

G. O. FINCH, Assistant Examiner.